United States Patent
Brown et al.

(10) Patent No.: US 6,729,247 B2
(45) Date of Patent: May 4, 2004

(54) MOBILE CREMATORIUM

(76) Inventors: Andrew Brown, Post Office Drawer 17786, Greenville, SC (US) 29606-8786; Nelle B. Brown, Post Office Drawer 17786, Greenville, SC (US) 29606-8786

( * ) Notice: Subject to any disclaimer, the term of this patent is extended or adjusted under 35 U.S.C. 154(b) by 186 days.

(21) Appl. No.: 10/006,012

(22) Filed: Dec. 4, 2001

(65) Prior Publication Data

US 2003/0101916 A1 Jun. 5, 2003

(51) Int. Cl.$^7$ .............................. F23B 7/00; F23G 1/00
(52) U.S. Cl. .................... 110/341; 110/241; 110/194
(58) Field of Search ................ 110/240, 241, 110/194, 341, 346

(56) References Cited

U.S. PATENT DOCUMENTS

| | | | | |
|---|---|---|---|---|
| 2,625,121 A | * | 1/1953 | Vanderwerf | 110/3 |
| 3,728,976 A | * | 4/1973 | Domnitch | 110/8 R |
| 4,257,335 A | | 3/1981 | Albertsson | 110/194 |
| 4,685,403 A | * | 8/1987 | Crawford | 110/194 |
| 4,688,494 A | * | 8/1987 | Domnitch | 110/240 |
| 4,753,176 A | * | 6/1988 | Duran | 110/194 |
| 4,781,174 A | | 11/1988 | Gardner | 126/452 |
| 5,014,630 A | | 5/1991 | Looker | 110/194 |
| 5,095,826 A | | 3/1992 | Erisson et al. | 110/212 |
| 5,237,938 A | * | 8/1993 | Fujimori et al. | 110/240 |
| 5,339,752 A | * | 8/1994 | Lewis | 110/194 |
| 5,341,548 A | | 8/1994 | Zerick | 27/28 |
| 5,699,745 A | | 12/1997 | Kaehr | 110/194 |
| 5,727,481 A | * | 3/1998 | Voorhees | 110/237 |
| 5,740,637 A | | 4/1998 | Snow | 52/136 |
| 5,743,195 A | | 4/1998 | Sucharski | 110/194 |
| 5,957,065 A | | 9/1999 | Hough et al. | 110/194 |
| 6,352,040 B1 | * | 3/2002 | Voorhees et al. | 110/237 |

* cited by examiner

Primary Examiner—K. B. Rinehart
(74) Attorney, Agent, or Firm—Joseph T. Guy; Nexsen Pruet Jacobs & Pollard, LLC

(57) ABSTRACT

A method, and apparatus, for cremating the remains of a deceased being. The method comprises transporting a mobile crematorium to a location wherein the deceased is to be cremated. The mobile crematorium comprises a first combustion chamber, wheels and a trailer hitch. The deceased remains are then heated in the first combustion chamber to a temperature of at least 1000° F. thereby creating combustion gases and noncombustible materials. The combustion gases are allowed to exit the first combustion chamber and the noncombustible materials are removed and placed in a storage device such as an urn.

1 Claim, 8 Drawing Sheets

MOBILE CREMATORIUM

TECHNICAL FIELD

The present invention is related to a crematorium. More specifically the present invention is related to a mobile crematorium.

BACKGROUND

It is an unfortunate reality that disasters occur which result in large numbers of deaths. Disasters can be natural; such as hurricanes, earthquakes, etc., or they may be induced; such as acts of war or terrorism. When such disasters occur it is often necessary to lay large numbers of human remains to their final rest.

Mass graves are sometimes used wherein large numbers of human bodies are entered into a common grave and covered for burial. This is undesirable for many reasons including the difficulty associated with obtaining portions of land which are suitable for such mass burials. Cremation is possible yet this is unpractical since the bodies must be transported at a high cost and any transportation across borders may require excessive paper work and administrative expense at a time when most individuals are not prepared for such efforts.

In the normal course of life many people choose to be cremated after death. The cost of establishing a crematorium is high which limits the number of businesses wishing to establish this capability. A further complication is the problem associated with jurisdictions. It is not uncommon for states to have limitations on the ability to transport deceased bodies over territorial lines unless they are embalmed. Therefore, if a crematorium does not exist in a certain jurisdiction the body may need to be embalmed prior to transporting them to a crematorium in another jurisdiction. The cost of embalming is therefore an additional expense which is unwarranted and typically occurs at a time of emotional stress for the families of the deceased.

There is a need in the art to eliminate the necessity for a crematorium in every jurisdiction. There is also a need to circumvent the requirement that a deceased body be embalmed prior to transportation across jurisdictional boundaries. This problem has been eliminated by the present invention.

SUMMARY

It is an object of the present invention to provide a mobile crematorium which can be readily transported to diverse locations.

It is another object of the present invention to provide a mobile crematorium which can be transported behind a tow vehicle, such as a car or truck, to a location and then the crematorium can be converted to a stationary crematorium by removal of the incinerator from the frame and wheels.

These, and other objects, are provided in a method for cremating the remains of a deceased being. The method comprises transporting a mobile crematorium to a location wherein the deceased is to be cremated. The mobile crematorium comprises: a first combustion chamber, wheels, and a trailer hitch. The deceased remains are then heating in the first combustion chamber to a temperature of at least 1000° F. thereby creating combustion gases and noncombustible materials. The combustion gases are allowed to exit the first combustion chamber and the noncombustible materials are removed and placed in a storage device such as an urn.

A particularly preferred embodiment is provided in a mobile crematorium. The mobile crematorium comprises a frame with an incinerator, wheels and a hitch attached thereto. The incinerator comprises a first combustion chamber with a first combustion source and a second combustion chamber with a second combustion source. Combustion of the deceased occurs in the combustion chamber. Gases created by the first combustion are further combusted in the second combustion chamber.

A particularly preferred embodiment is provided in a method for cremating the remains of a deceased being. A mobile crematorium is transported to a location where the deceased being is to be cremated. The mobile crematorium comprises a first combustion chamber, wheels and a trailer hitch. The deceased being is heated in the first combustion chamber to a temperature of at least 1000° F. to create combustion gases and noncombustible materials. The combustion gases exit the first combustion chamber and pass through a secondary combustion chamber. The secondary combustion chamber further comprises a heat source for further combusting the gases. The noncombustible materials are removed and placed in a storage device.

DETAILED DESCRIPTION

The present invention provides a mobile crematorium which greatly increases the availability of cremation to diverse areas without the high cost associated with development of a fixed crematorium. The invention will be described by reference to the drawings wherein similar elements are numbered accordingly.

Figure 1:
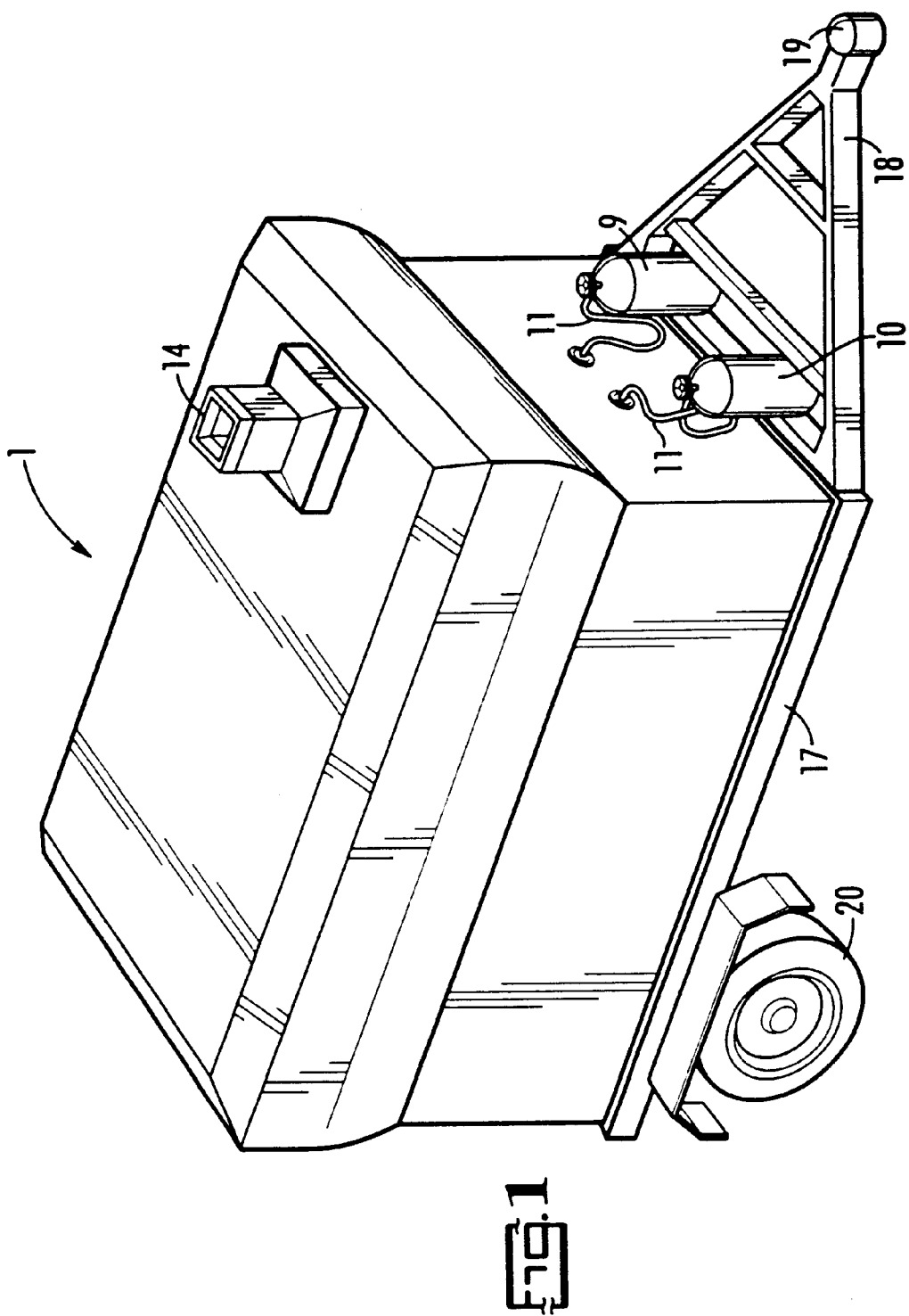
FIG. 1 is a perspective view of a preferred embodiment of the present invention.

A mobile crematorium, generally represented at 1, is shown in perspective view in FIG. 1. The mobile crematorium, 1, comprises an incinerator mounted on a frame, 17. The frame, 17, has adapted thereto a trailer tongue, 18, and associated hitch, 19. The frame, 17, further comprises a pair of wheels, 20. Attached to the frame, preferably on the tongue, 18, is at least one gas bottle, and more preferably, a pair of gas bottles, 9 and 10, which supply a combustion mixture to an incinerator by pipes, 11. A flue, 14, allows for gases of combustion to be discharged.

Figure 2:
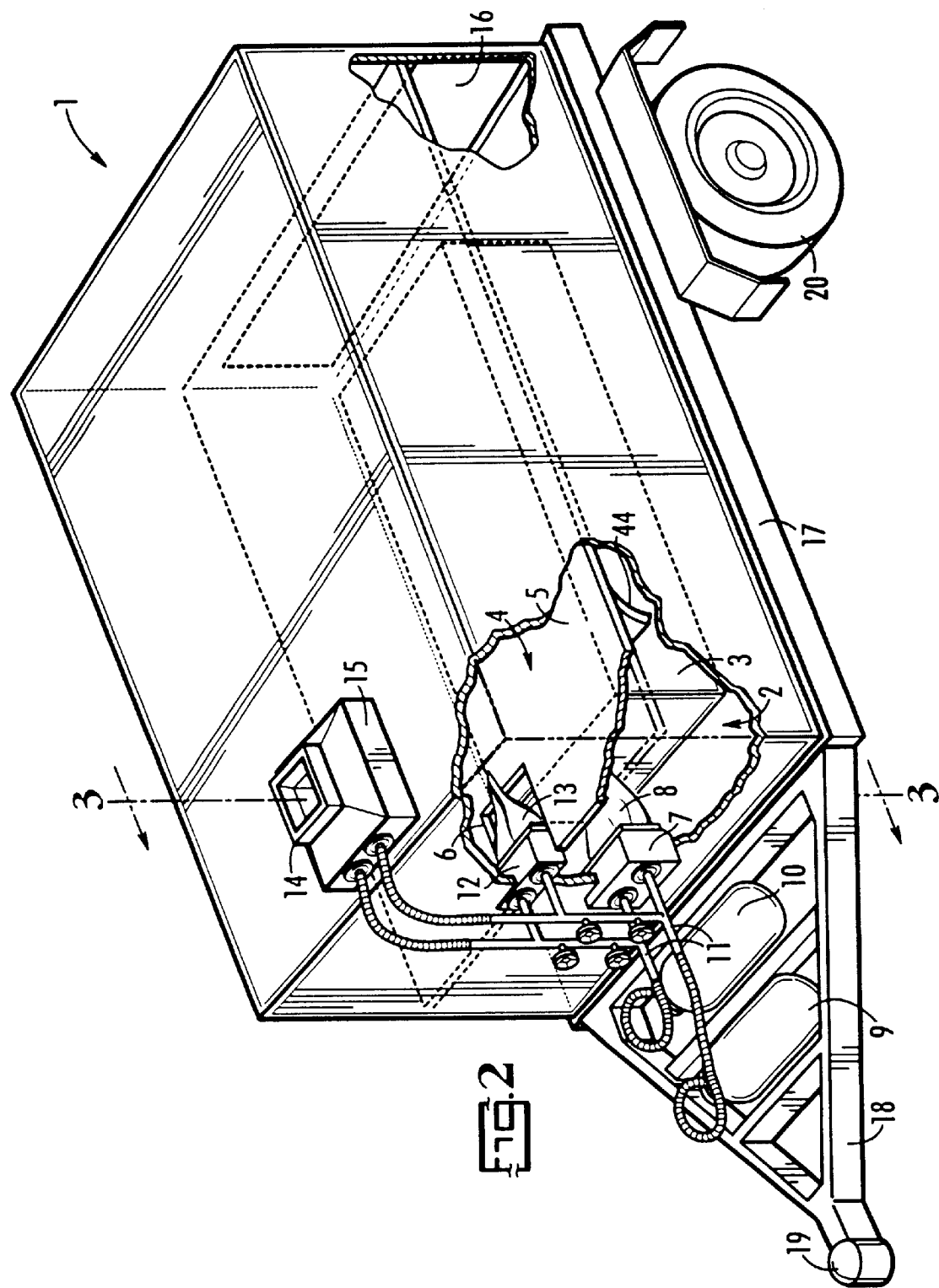
FIG. 2 is a partial cutaway view of a preferred embodiment of the present invention shown in perspective view.

A mobile crematorium, generally represented at 1, is shown in partial cutaway perspective view in FIG. 2. In general, the mobile crematorium comprises a primary combustion chamber, 2, within which a casket, 3, is subjected to a heat sufficient to initiate combustion of the casket and contents. An optional, but preferred, secondary combustion chamber, 4, is separated from the primary combustion chamber by a shield plate, 5. The dual combustion chamber and shield plate generate a generally serpentine path for combustion product thereby increasing combustion and allowing for the proper elimination of minimally combusted gases. In one embodiment the shield plate, 5, comprises a slot, 6, through which gas transits from the primary combustion chamber to the secondary combustion chamber.

A primary incinerator, 7, generates a primary flame, 8, which is the source of heat which causes the casket and contents to combust. The primary incinerator, 7, is preferably a gas incinerator supplied by a portable gas bottle, 9. The portable gas bottle, 9, preferably comprises an alkane gas, preferably propane. Oxygen for combustion can be supplied from ambient air or an auxiliary portable gas bottle, 10, comprising an oxidizing gas, preferably oxygen. The gas bottles supply gas to the primary incinerator, 7, through pipes, 11, as would be apparent to one of ordinary skill in the art.

Combustion of the casket and contents creates combustion gases. Some portion of the combustion gas is the product of incomplete combustion. As well known in the art, it is imperative that most of the gas be fully oxidized prior to exhausting from the mobile crematorium. Towards this goal an optional, but preferred, secondary incinerator, 12, creates a secondary flame, 13, which ignites any gases passing through the slot, 6, which are not the product of complete combustion. In one embodiment the slot, 6, is integral to the secondary incinerator, 12, such that the gases created in the primary combustion chamber are incorporated in the feed gas for the secondary incinerator.

The gaseous products of combustion exit the mobile crematorium through a flue, 14, which is preferably attached to the top of the mobile crematorium. The flue, 14, preferably comprises a flue incinerator, 15, which insures that any gaseous product which is not a byproduct of complete combustion will be combusted further.

A door, 16, reversibly seals the rear of the combustion chamber, 2, to allow insertion of a casket and removal of non-combustible material which is typically ash.

The mobile crematorium further comprises a frame, 17, which is adapted at the front end with a triangular portion, 18, which terminates at a trailer hitch, 19. Wheels, 20, are attached to the frame by a bracket and axle assembly as would be known in the art. The trailer hitch allows the entire mobile crematorium to be towed behind a vehicle on the wheels, 20.

An optional deflector, 44, insures that ash remains in the primary chamber.

Figure 3:
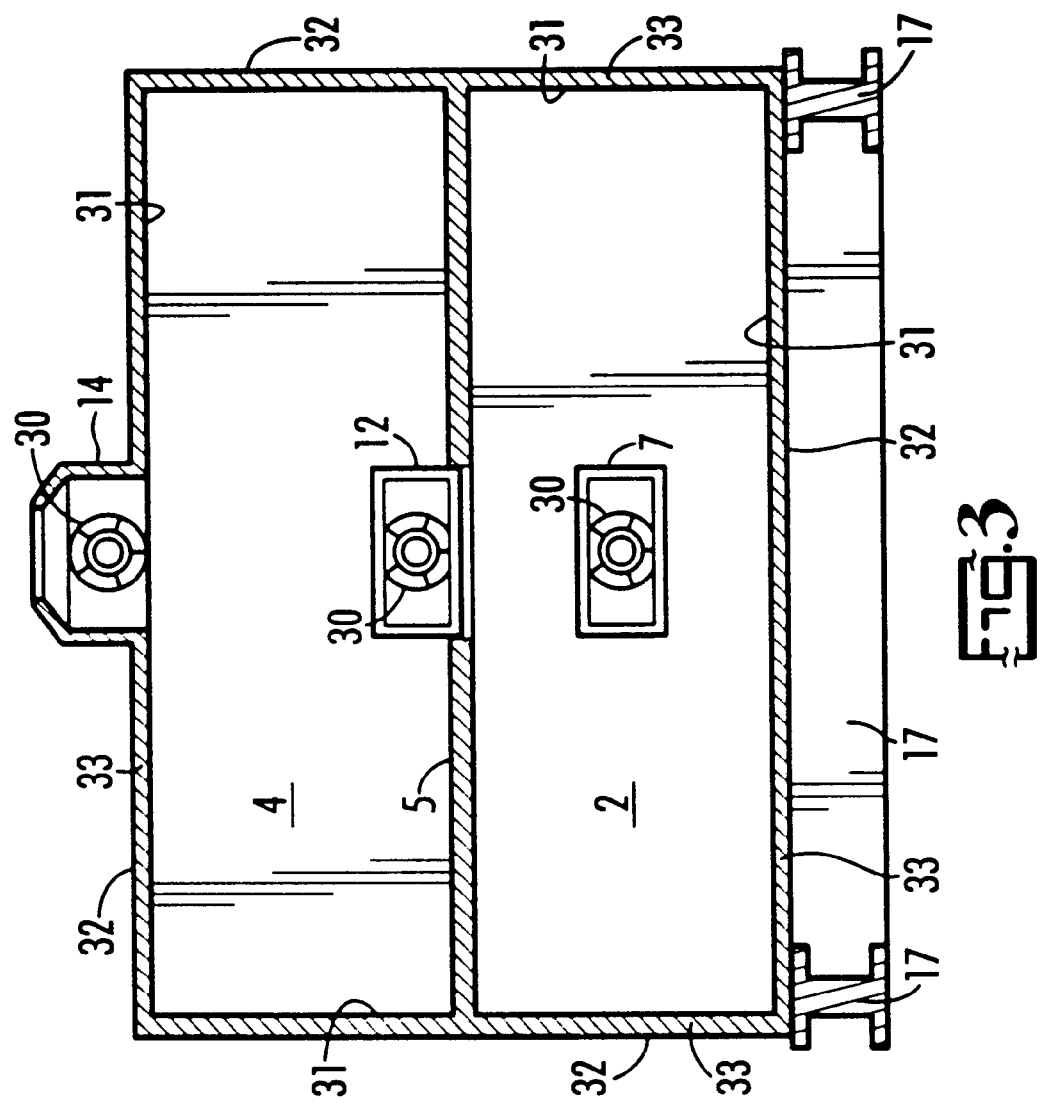
FIG. 3 is a cross-sectional view of the embodiment of FIG. 2 taken along line 3—3 of FIG. 2.

A cross-sectional view taken along line 3—3 of FIG. 2 is provided in FIG. 3. In FIG. 3 the flame is extinguished thereby allowing the various incinerators to be more readily visualized Each incinerator preferably comprises a nozzle, 30, which directs the flame. For the primary incinerator, 7, and secondary incinerator, 12, the nozzle preferably directs the flame towards the rear of the respective chamber. For the flue incinerator, 14, the nozzle directs the flame outward. The reasons for the preferred directional orientation of the flames will be described further in reference to FIG. 5.

The exterior walls of the mobile crematorium preferably comprise an interior liner, 31. The interior liner is preferably a metal which is stable with respect to heat. A particularly preferred interior liner is stainless steel. The exterior walls also preferably comprise an exterior liner, 32. The exterior liner is chosen for aesthetics but also the liner provides an exterior material for heat insulation and to protect the insulator, 33, which is preferably between the interior liner and exterior liner. Stainless steel is particularly preferred as an exterior liner. The insulator is preferably a ceramic fibrous material. Typical insulators comprising oxides of silicon, calcium, and magnesium with lower levels of aluminum and iron oxides are particularly suitable for the present invention.

Figure 4:
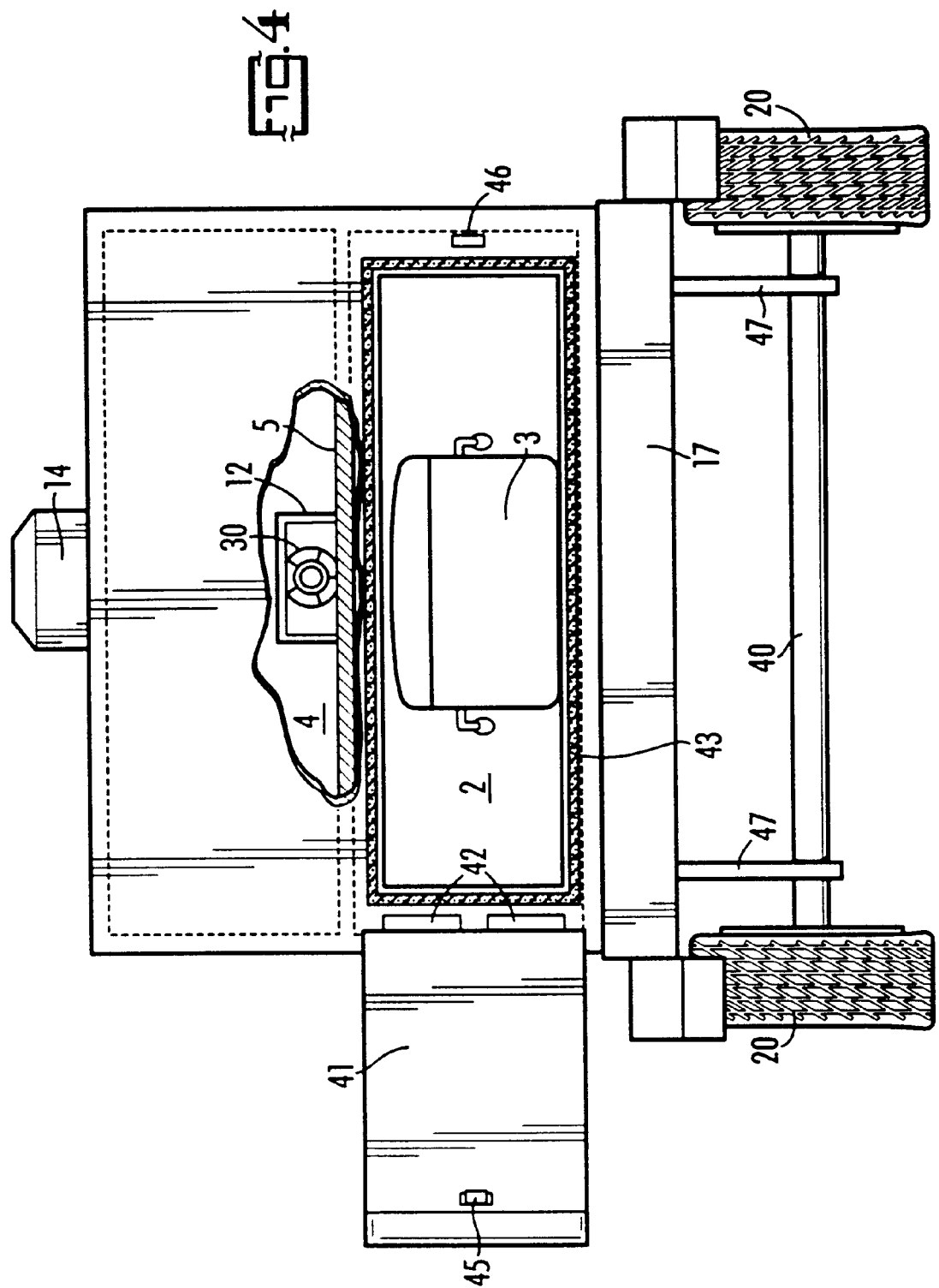
FIG. 4 is a rear view of an embodiment of the present invention.

A rear view of the mobile crematorium is provided in FIG. 4. In FIG. 4, the casket, 3, is shown inside the primary combustion chamber, 2. A door, 41, attached to the exterior of the mobile crematorium by hinges, 42, allows the casket to be entered into the primary combustion chamber, 2. The door is then closed and sealed by compressing a seal, 43, between the door, 41 and exterior wall of the mobile crematorium. The seal is preferably a ceramic fiber, such as alumina silicate, made into rope which is then secured to the mobile crematorium preferably in a recess. Multiple concentric seals can be used if so desired to insure that a minimal amount of heat is lost. The door is preferably secured in the closed position by a handle, 45, and latch, 46, as would be understood in the art. The wheels, 20, are rotatably attached to an axle, 40, which is secured to the frame by a bracket, 47. The bracket may further comprise shocks and springs as well known in the art of securing an axle to a frame.

In practice, the secondary chamber and/or primary chamber are preheated to a desired temperature. The primary incinerator is preferably extinguished and the casket, or remains, is placed in the primary combustion chamber through the door. The incinerators are then ignited with the preferred order of ignition being flue, secondary, primary. This insures that any gases created in the primary combustion chamber are sufficiently oxidized. The chambers are heated for a sufficient amount of time to insure complete combustion. It is preferred that the primary chamber be heated to a temperature of at least 1000° F. and more preferably the primary chamber is heated from approximately 1200° F. to approximately 2200° F. The secondary combustion chamber is preferably heated to approximately 1800–2200° F. After combustion is complete the chambers are allowed to cool and the remaining ash and non-combusted materials are removed from the combustion chamber with a device such as that described in U.S. Pat. No. 5,743,195 which is incorporated herein by reference thereto.

Temperature controllers are described in U.S. Pat. No. 5,699,745 which is incorporated herein by reference thereto. Burners and controls are described in U.S. Pat. Nos. 5,957, 065; 5,014,630 and 4,257,335 each of which is incorporated herein by reference thereto.

Figure 5:
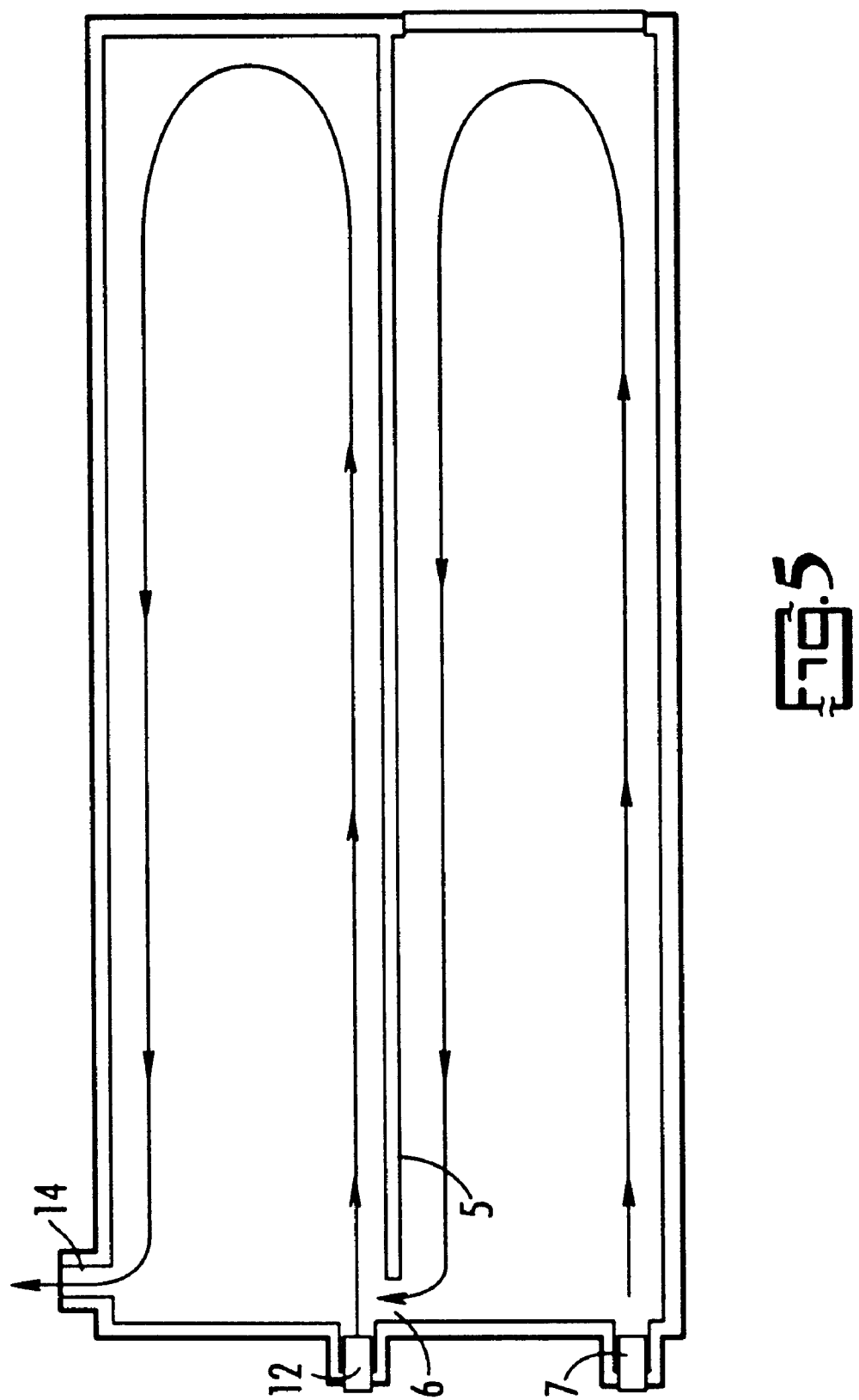
FIG. 5 is a schematic view of a preferred air flow pattern inside the mobile crematorium.

A preferred flow path of combustion gases is illustrated schematically in cross-sectional view in FIG. 5. In FIG. 5 the primary flame generates a flow pattern which is away from the primary incinerator, 7. Upon contacting the back wall the gas reverses and eventually escapes from the primary combustion chamber into the secondary combustion chamber through the slot, 6, in the shield plate, 5. The secondary flame from the secondary incinerator, 12, continues to persuade the gases in a serpentine path for eventual exit through the flue, 14. The serpentine path allows sufficient time for the gases of combustion to be fully oxidized thereby decreasing the emission of partially oxidized gases. Furthermore, the serpentine path encourages the ash to settle in the primary combustion chamber instead of being aspirated into the secondary combustion chamber or flue. It is a desire that the ash be completely recovered for sentimental reasons and to avoid ashes from different cremation events being interspersed.

Figure 6:
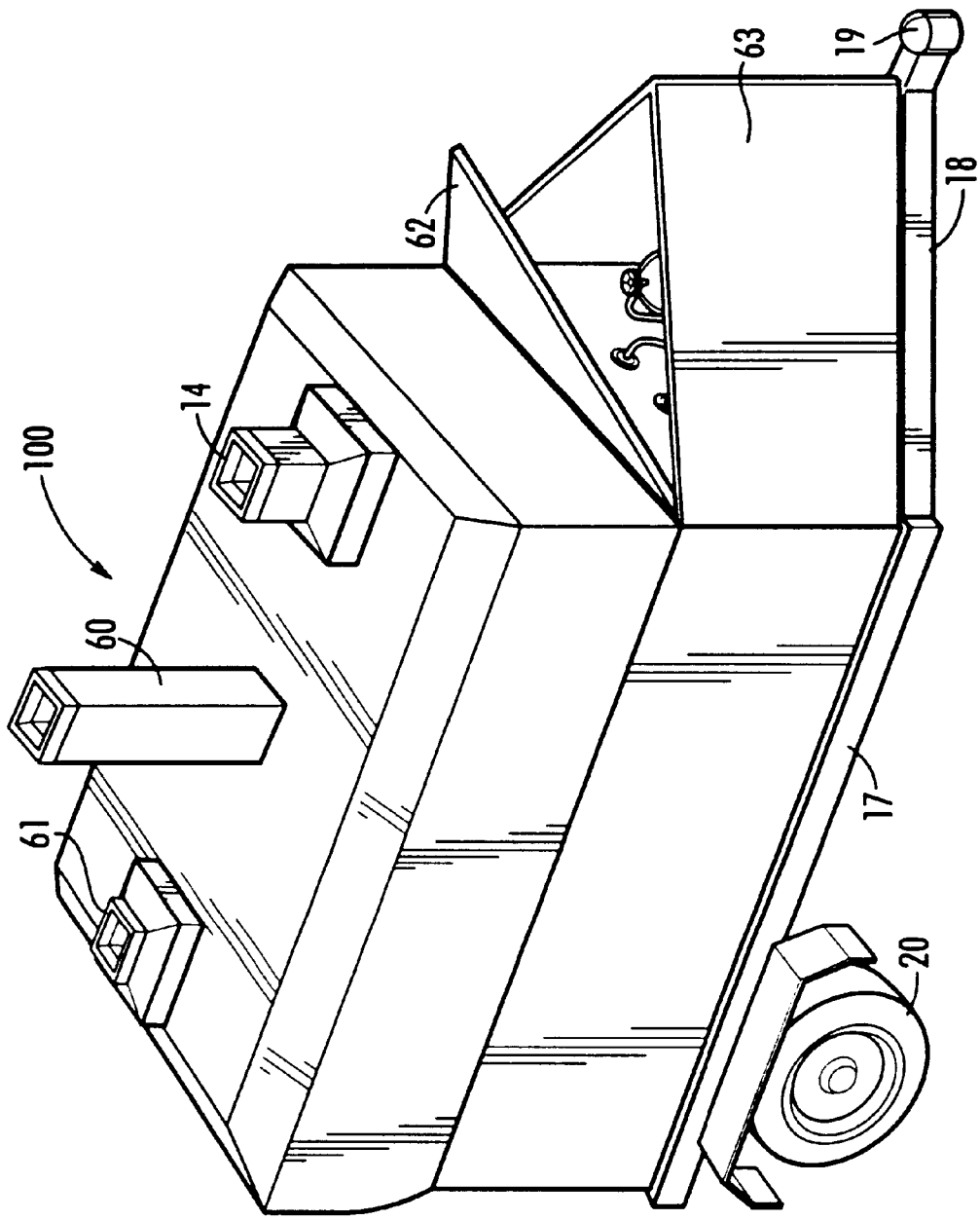
FIG. 6 is a perspective view of a preferred embodiment of the present invention.

A particularly preferred embodiment is illustrated in FIG. 6. In FIG. 6 the mobile crematorium, generally represented at 100, has the aesthetic design of a ship. The wheels, 20, frame, 17, tongue, 18, trailer hitch, 19, and flue, 14, are as described previously. A storage structure, 63, extending upward from the tongue, 18, provides the visual appeal of a ship bow. An optional, but preferred, cover, 62, allows the storage structure, 63, to be used for storage and concealment of supplies such as gas bottles and the like.

Additional flues, 60, or blank flue stacks, 61, further contribute to the visual appearance of a ship. The flue may be utilized with additional chambers for further combustion or they may be aesthetic.

Figure 7:
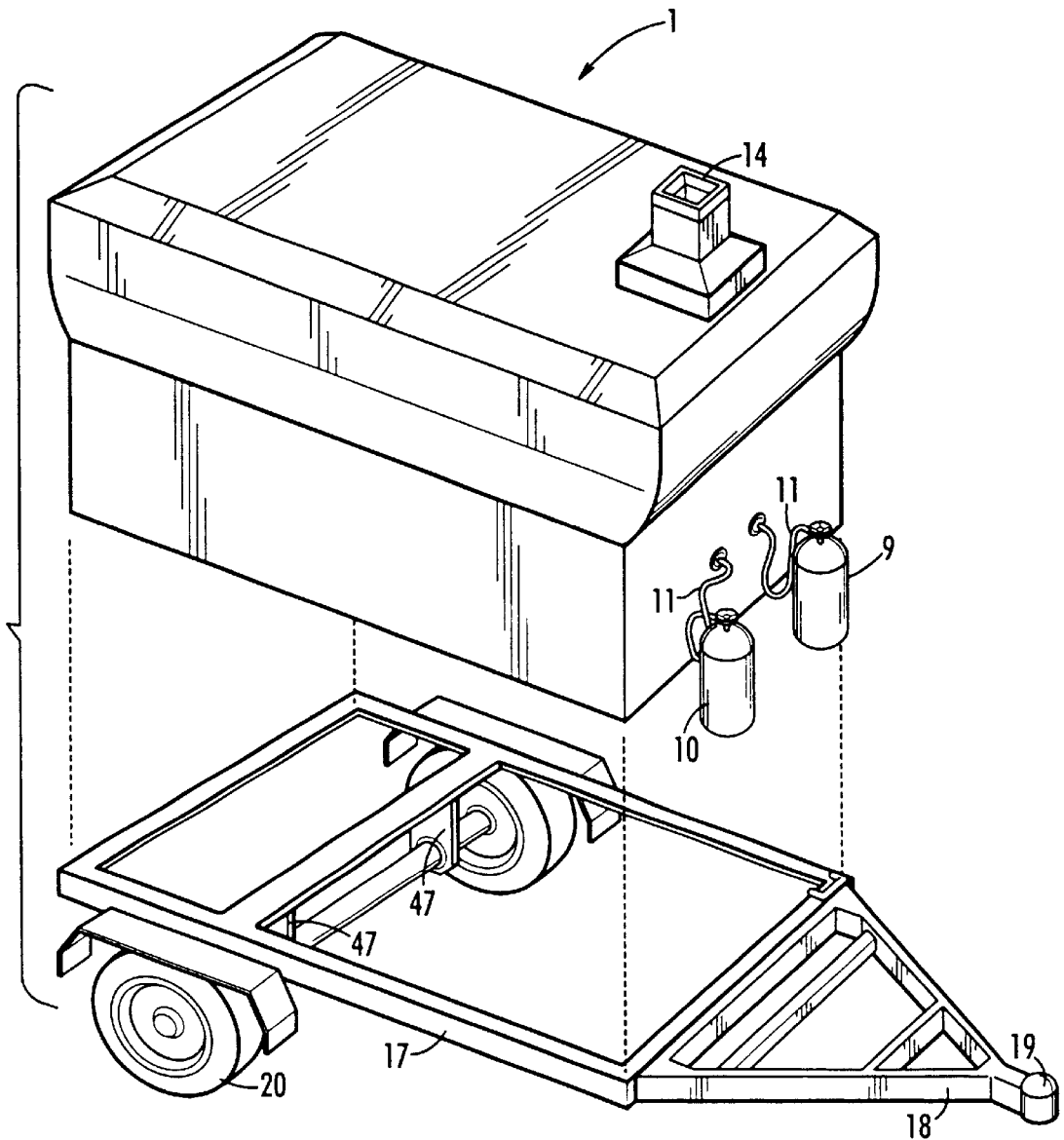
FIG. 7 is a view of an embodiment of the present invention wherein the incinerator and frame are separable.

FIG. 7 is a perspective view of the embodiment of FIG. 1 illustrating an embodiment wherein the incinerator is separable from the frame. This embodiment allows the incinerator to be transported by a tow vehicle, such as a car or truck, to a preferred location. The incinerator can then be placed on an elevated stand or on the ground to greatly improve the aesthetics of the device. Furthermore, the incinerator can be loaded on a ship, train car, of transport plane for transportation over long distances and then reloaded on a trailer for local transportation. This greatly increases the versatility of the mobile crematorium.

Figure 8:
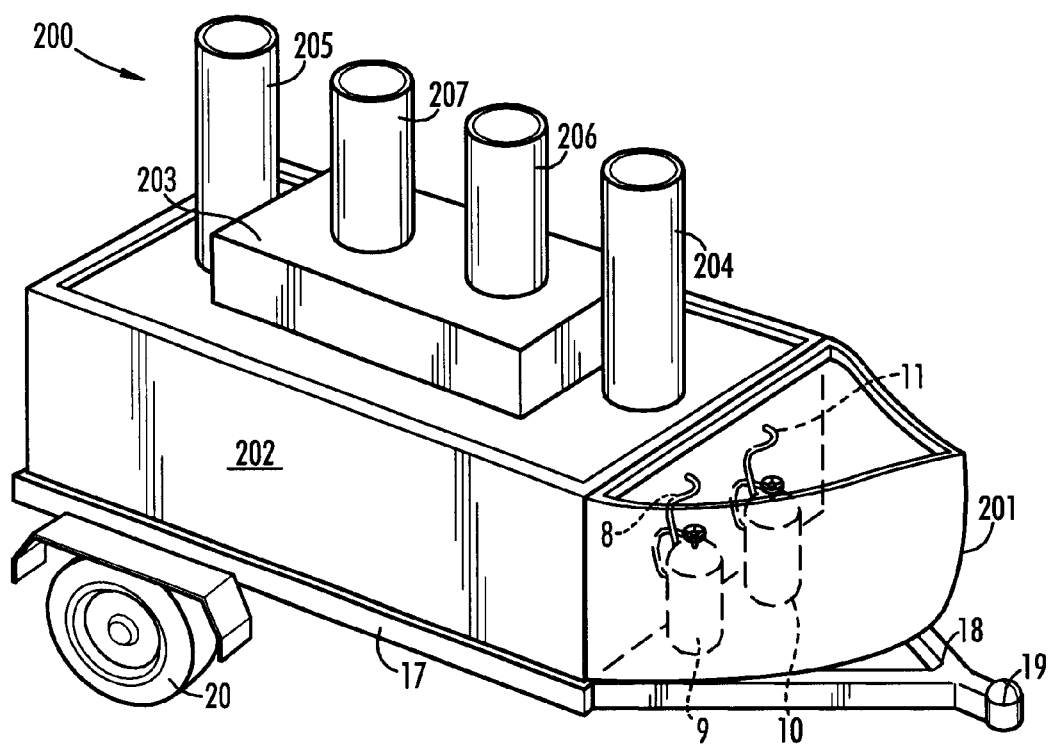
FIG. 8 is a view of a preferred embodiment of the present invention wherein the incinerator has provides the visual perception of a ship.

A perspective view of a particularly preferred embodiment is provided in FIG. 8. In FIG. 8, the incinerator, generally shown at 200, comprises a frame, 17, and wheels, 20, as described herein. The incinerator further comprises portable gas bottles, 9 and 10, with associated pipes, 11. The portable gas bottles may be reversibly mounted on a triangular portion, 18. A hitch, 19, allows the incinerator to be utilized as a trailer. The front of the incinerator preferably includes a triangulated enclosure, 201, which provides an enclosed storage area as well as the aesthetic appeal of a ship. The triangulated enclosure may further comprise a cover. Attached to the upper extent of the incinerator body, 202, is a superstructure, 203. The superstructure may be the secondary incinerator or the primary and secondary incinerator may be incorporated into the incinerator body, 202, in which case the superstructure may be a tertiary incinerator. The superstructure may also be aesthetic adding to the visual perception of a ship. Attached to the upper extent of the incinerator body, 202, are exhaust stacks, 204 and 205. Additional exhaust stacks, 206 and 207, are attached to the upper extent of the superstructure. At least one exhaust stack is a flue. If the superstructure is aesthetic then exhaust stacks 206 and 207 are aesthetic and one of 204 or 205 is a flue. If the superstructure is functional, such as a secondary or tertiary incinerator, then one of exhaust stacks 206 or 207 is a flue.

The frame is preferably manufactured from "I" beams due to the strength to weight ratio obtained thereby. Tubing, such as round or rectangular, may also be used for forming the frame. In one embodiment the mobile crematorium may be easily separated into a crematorium and a frame. For example, the mobile crematorium may function as a trailer for towing behind a vehicle or the crematorium may be separated from the frame and loaded onto a ship, barge, or railcar for transport over long distance rapidly and efficiently. In another embodiment the frame is integral to the crematorium and not able to be separated.

The mobile crematorium is generally a parallelopiped but other similar shapes including rounded parallelopiped are within the scope of the present invention.

The invention has been described with particular emphasis drawn to the preferred embodiments. The invention is set forth more specifically in the claims which follow.

What is claimed is:

1. A method for cremating the remains of a deceased being comprising:

transporting a mobile crematorium to a location of said deceased being wherein said mobile crematorium comprises:
 a first combustion chamber;
 wheels; and
 a trailer hitch;
heating said deceased being in said first combustion chamber to a temperature of at least 1000° F. to create combustion gases and noncombustible materials;
allowing said combustion gases to exit said first combustion chamber;
removing said noncombustible materials;
placing said removed noncombustible materials in a storage device wherein said first combustion chamber is separable from said frame; and
separating said first combustion chamber from said frame prior to said heating.

* * * * *